(12) United States Patent
Armstrong et al.

(10) Patent No.: US 8,665,999 B2
(45) Date of Patent: Mar. 4, 2014

(54) TREATING CARRIER-SPECIFIC INTERFERENCE

(75) Inventors: Dean Armstrong, Cambridge (GB); Alexander Thoukydides, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 522 days.

(21) Appl. No.: 12/752,870

(22) Filed: Apr. 1, 2010

(65) Prior Publication Data
US 2010/0254495 A1    Oct. 7, 2010

(30) Foreign Application Priority Data

Apr. 3, 2009    (GB) .................................. 0905860.3

(51) Int. Cl.
*H03D 1/00*    (2006.01)
(52) U.S. Cl.
USPC ........... 375/341; 375/260; 375/340; 370/329; 370/338; 370/281
(58) Field of Classification Search
USPC ......................................... 375/340, 341, 260
See application file for complete search history.

(56) References Cited

U.S. PATENT DOCUMENTS

| | | | | |
|---|---|---|---|---|
| 6,754,291 B1 * | 6/2004 | Okanoue et al. | ............... | 375/341 |
| 2003/0054755 A1 | 3/2003 | Zehavi et al. | | |
| 2004/0022175 A1 | 2/2004 | Bolinth et al. | | |
| 2006/0133259 A1 | 6/2006 | Lin et al. | | |
| 2006/0221808 A1 * | 10/2006 | Shirakata et al. | ............. | 370/203 |
| 2006/0286948 A1 * | 12/2006 | Taniguchi et al. | ............ | 455/140 |
| 2008/0260052 A1 * | 10/2008 | Hayashi | ........................ | 375/260 |

FOREIGN PATENT DOCUMENTS

| | | |
|---|---|---|
| EP | 1054541 A2 | 11/2000 |
| EP | 1689139 A2 | 9/2006 |
| WO | WO2005/099174 A1 | 10/2005 |
| WO | WO2007/069210 A2 | 6/2007 |

OTHER PUBLICATIONS

Combined Search and Examination Report dated Mar. 17, 2010 for Application No. GB0905860.3.

* cited by examiner

*Primary Examiner* — Eva Puente
(74) *Attorney, Agent, or Firm* — Vorys, Sater, Seymour and Pease LLP; Vincent M DeLuca

(57) ABSTRACT

A receiver for receiving data carried by multiple carriers, the receiver having: estimation means for forming an estimate of the reliability with which data from one or more of the carriers is received as distinct from the reliability with which data from one or more other of the carriers is received; and a decoder arranged for forming an estimate of the symbols represented by the data received from the carriers in dependence on the estimate of reliability.

20 Claims, 1 Drawing Sheet

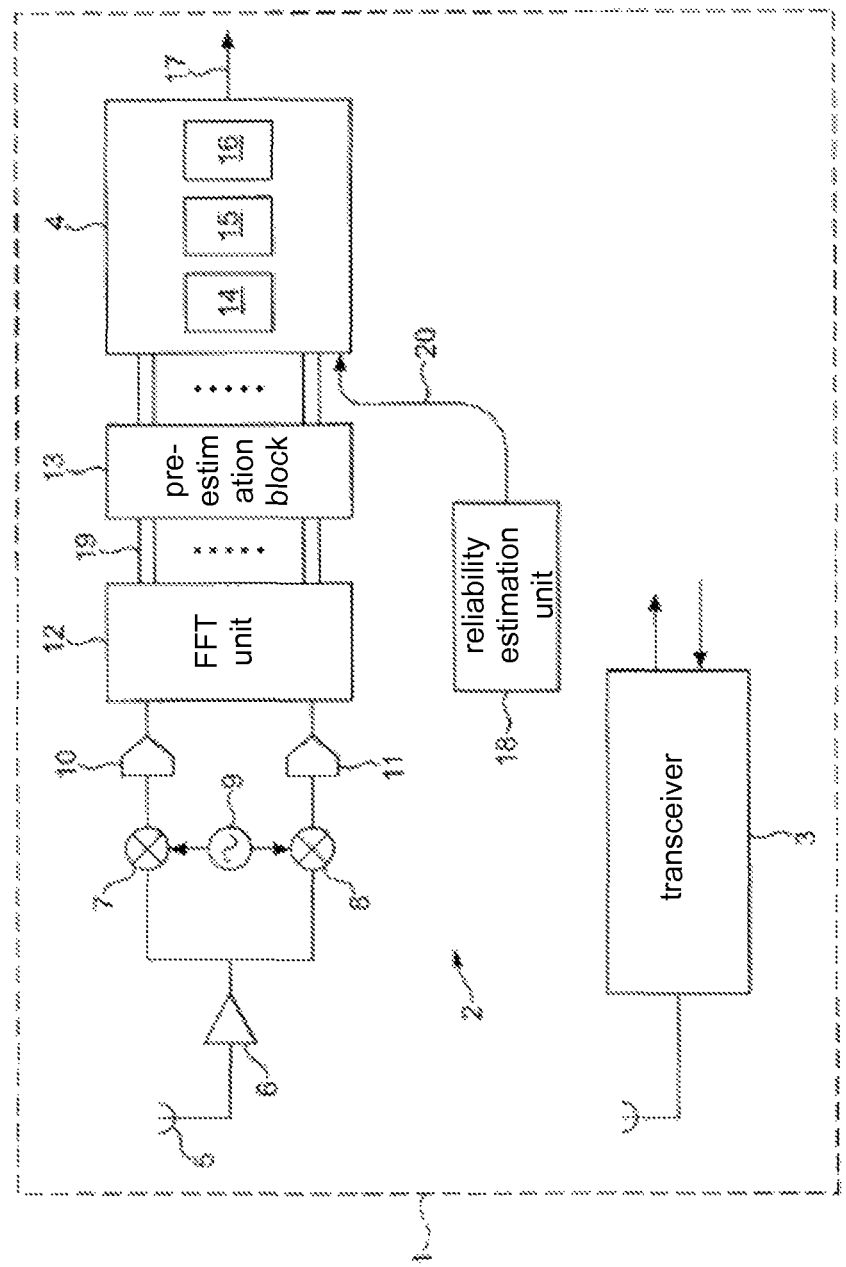

TREATING CARRIER-SPECIFIC INTERFERENCE

RELATED APPLICATIONS

This application claims priority to United Kingdom Application No. GB 0905860.3, filed 3 Apr. 2009 (Title: TREATING CARRIER-SPECIFIC INTERFERENCE; Inventors: Armstrong et al.; Applicant: Cambridge Silicon Radio Limited), which is hereby incorporated in its entirety by reference herein.

FIELD OF THE DISCLOSURE

This disclosure relates to mechanisms for handling interference that affects some signal carriers more than others. The disclosure is particularly but not exclusively applicable to UWB (ultra-wideband) radio receivers.

BACKGROUND

UWB systems involve spreading data over a wide range of frequencies. UWB is typically defined as occupying a bandwidth greater than 500 MHz or 25% of the center frequency. This characteristic of UWB carries the benefit that interference from UWB systems to other systems is expected to be low. However, because UWB systems occupy a wide bandwidth they can be expected to suffer interference from other systems that occupy parts of their frequency space. That is a particular problem when a UWB receiver is located in a device that also has a transmitter for such an other system. In that situation the UWB receiver may receive very strong interference at the frequencies on which the transmitter is transmitting.

Various forms of redundancy are incorporated in most data transmission protocols, so that data that is not received successfully can be recovered. However, it is nevertheless preferable to reduce the impact that interference has on a receiver's ability to decode a received signal.

BRIEF DESCRIPTION OF THE DRAWING

The present disclosure will now be described by way of example with reference to the accompanying drawing. In the drawing:

FIG. 1 is a schematic diagram of a device including a UWB receiver.

DETAILED DESCRIPTION

According to the present disclosure there is provided a receiver for receiving data carried by multiple carriers, the receiver having: estimation means for forming an estimate of the reliability with which data from one or more of the carriers is received as distinct from the reliability with which data from one or more other of the carriers is received; and a decoder arranged for forming an estimate of the symbols represented by the data received from the carriers in dependence on the estimate of reliability.

The estimation means may be arranged to form an estimates of the reliability with which data from each of the carriers is received. The decoder may be arranged to receive data from each carrier together with the estimate of reliability formed for the respective channel and to form an estimate of the symbols represented by the data received from the carriers in dependence on the data from each carrier and the estimate of reliability formed for the respective channel.

The estimation means may be arranged to form estimates of the reliability with which data from each of the carriers is received. The decoder is arranged to ignore data from any carrier for which the estimate of reliability is below a predetermined threshold.

The receiver may comprise an input for receiving a signal and a carrier estimator for dividing the received signal into the multiple carriers.

The carrier estimator may be arranged to perform a Fourier transform operation to divide the received signal into the multiple carriers.

Each carrier may occupy a respective frequency or frequency band in the received signal. Each carrier may occupy a respective frequency or frequency band in the received signal that is distinct from those occupied by all the other carriers. The carriers may be carriers of an OFDM signal.

The decoder may be a Viterbi decoder.

The receiver may include a quality estimator for estimating the quality with which signals are received on each of the channels. The estimation means may form an estimate of the reliability of data received on a channel in dependence on the quality estimate for that channel.

The estimation means may form the said estimate in dependence on usage data indicating the usage of one or more frequencies in such a way that a lower reliability estimate is formed for data received on a channel occupying such a frequency than on channels not occupying such a frequency.

According to a second aspect of the present disclosure there is provided a device comprising a receiver as set out above and a transmitter for transmitting signals from the device, the transmitter being arranged to signal the usage data to the receiver so as to indicate the usage of one or more frequencies by the transmitter.

The receiver and the transmitter may be formed on a single integrated circuit.

According to a third aspect of the present disclosure there is provided a method for receiving data carried by multiple carriers, the method comprising: forming an estimate of the reliability with which data from one or more of the carriers is received as distinct from the reliability with which data from one or more other of the carriers is received; and forming an estimate of the symbols represented by the data received from the carriers in dependence on the estimate of reliability.

The device 1 of FIG. 1 includes a UWB receiver 2 and a transceiver 3 for another protocol. The receiver is intended for receiving signals of a UWB protocol in which data is sent using multiple sub-carriers. A soft decision Viterbi decoder 4 is used to make a decision on the symbols received by receiver 2. For this purpose the decoder receives an estimate of each symbol received together with an indication of that symbol's reliability. The indication of reliability is formed taking into account information about the interference expected on the channel on which the respective symbol was received.

The receiver 2 of FIG. 1 is intended for receiving UWB signals according to the standard defined by the "Multiband OFDM Physical layer specification", published by the Multiband OFDM Alliance (MBOA) Special Interest Group (SIG). In that system data is carried on multiple carriers each of a separate frequency by means of an OFDM (orthogonal frequency division multiplexing) scheme. However, the present disclosure is not limited to use with this protocol.

The receiver 2 of FIG. 1 comprises an antenna 5 which receives radio signals. The radio signals are amplified by amplifier 6 and then mixed in mixers 7, 8 with in-phase and quadrature signals from a local oscillator 9 so as to downconvert the received signals to a suitable intermediate frequency. The I and Q signals are then digitized in ADCs (analog to digital converters) 10, 11 and passed to a fast Fourier transform (FFT) unit. The FFT unit 12 performs an FFT on the received data and generates a series of bitstreams as illustrated at 19. Each bitstream represents the data on a carrier of a respective frequency, there being one bitstream for each carrier. Filtering steps may be carried out in digital and/or analogue.

The bitstreams are processed in a pre-estimation block 13 to perform operations such as removing pilot signals and de-interleaving the data bits, and the resulting bits are fed to the soft decision Viterbi decoder 4.

The Viterbi decoder comprises a branch metric unit 14 which forms branch metrics based on the data passed to the decoder, a path metric unit 15 which updates path metrics based on the branch metrics and a traceback unit 16 which traces back a preferred branch metric to determine the symbols associated with that branch metric. Those symbols are output from the decoder at 17 as estimates of the received symbols. The output symbols can then be further processed by other components of the device. Each bit input to the Viterbi decoder is tagged with a representation of its reliability. This may conveniently take the form of one or more bits that represent the degree of confidence that the receiver has that that bit has been received correctly. The tagging may be done per-bit, or there may be a symbol estimation step before the decoder. The branch metric unit takes those reliabilities into account when calculating its branch metrics.

The reliability data is formed by a reliability estimation unit 18. This is conveniently, but not necessarily, implemented in software or firmware. The reliability estimation unit receives data from one or more sources, examples of which will be described below, which indicate the reliability of each of the carriers in the system. Each carrier corresponds to one of the bitstreams 19. The reliability estimation unit can therefore tag the data that is input to the Viterbi decider with the appropriate reliability representation.

In the device of FIG. 1 the transceiver 3 is a transceiver for IEEE 802.11 signals. This transceiver has knowledge of the frequencies on which it is transmitting or will transmit and may also have knowledge of the frequencies that are being used or will be used for transmission by associated devices, such as an access point to which it may be connected. The transceiver 3 signals that information to the reliability estimation unit 18 over line 20. If any of those frequencies or frequency bands overlap with one of the OFDM channels then the receiver tags the bitstream for that channel with a reliability estimate that indicates the data to be unreliable.

In operation, the receiver's components that are upstream of the Viterbi decoder produce a bitstream in the manner described above. In parallel the reliability estimation unit is receiving information about the frequencies that are in use by the transceiver 3. The reliability estimation unit tags as unreliable the data received on OFDM channels that overlap with the frequencies or frequency bands that reported by the transceiver 3 to be in use. The Viterbi decoder decodes the data taking the reliability information into account and forms an estimate of the received symbols. That estimate that is dependent on the reliability information since in forming the branch metrics greater weight is attributed to data believed to have been receiver with higher reliability than on data believed to have been receiver with lower reliability.

The use of per-carrier reliability data allows the receiver's reception accuracy to be enhanced. That may allow higher data rates to be used in any given reception conditions.

The present system is readily applicable to protocols that spread data over multiple carriers that are spaced apart in the frequency domain, such as OFDM systems. However, it could be applied to protocols in which the carriers are separated by other means, such as time or spreading code, if the expected interference is such that it would affect such carriers differentially. The protocol is preferably such that forward error correction is performed over all the carriers to which the system can apply differential reliability weighting, in order that data received from those carriers can usefully be processed collectively by the Viterbi decoder.

The reliability estimator could receive data from other sources than the transceiver 3. It could receive data from estimates of the quality of the signals received by the receiver 2, for example the signal quality of each carrier or from analysis of the error rate on each carrier. It could receive data from an external device that signals the device 1 with information on other frequencies that are in use. That data could be received over a wireless link, conveniently the same link as the reliability data will be used to help decode.

The frequencies used by the transceiver 3 or devices of which it has knowledge may vary over time. The reliability estimator preferably alters the channels that it tags as being unreliable accordingly. To achieve this the transceiver 3 may signal the reliability estimator each time it or another device changes channels or starts or stops transmission, or it may provide a schedule of such changes to the reliability estimator in advance. In that way the decoder can treat the received data as less reliable only during those times when the corresponding frequencies are in use elsewhere.

The reliability information may also take account of the expected severity of the interference. For example, frequencies in use by the transmitter of the collocated transceiver 3 may be treated as less reliable than frequencies expected to be in use by another nearby device, which are in turn treated as less reliable than frequencies on which interference is not expected.

The reliability information could conveniently take the form of one or more bits—for example two bits—that are joined with the data bit to which they relate in order to form a data word for input to the Viterbi decoder.

Instead of using multi-level reliability data, the Viterbi decoder could simply be configured to ignore data received on carriers that are expected to be less reliable. This could allow a hard decision Viterbi decoder to be used.

Similar principles may be applied to sub-carriers as to carriers. The decoder could be signalled with reliability data for each sub-carrier.

The receiver 2 is suitably implemented on a single integrated circuit (IC), although it may be implemented using discrete components. It may be implemented on the same IC as the transceiver 3. The IC may include a transmitter for transmitting on the same system as is used by the receiver.

The device 1 in which the receiver 2 is implemented may take any suitable form. Non-limiting examples include mobile phones, notebook computers, personal organizers and network bridging devices.

Instead of a Viterbi decoder, other forms of likelihood-based decoding could be used.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

The invention claimed is:

1. A device comprising a transmitter and a receiver for receiving data carried by multiple carriers, the receiver comprising:
    an estimation unit configured to form an estimate of a reliability with which data from one or more of the carriers is received as distinct from a reliability with which data from one or more other of the carriers is received; and
    a decoder configured to form an estimate of symbols represented by the data received from the carriers in dependence on the estimate of reliability,
    wherein the estimation unit is configured to use knowledge of which frequencies the transmitter and a nearby device are using to form the estimate of reliability, such that carriers in use by the transmitter are treated as less reliable than carriers in use by the other nearby device, which are in turn treated as less reliable than carriers on which interference is not expected.

2. A device as claimed in claim 1, wherein:
    the estimation unit is configured to form estimates of reliability with which data from each of the carriers is received, and
    the decoder is configured to receive data from each carrier together with the estimate of reliability formed for that carrier, and to form an estimate of symbols represented by the data received from the carriers in dependence on the data from each carrier and the respective estimates of reliability of each carrier.

3. A device as claimed in claim 1, wherein:
    the estimation unit is configured to form estimates of reliability with which data from each of the carriers is received; and
    the decoder is configured to ignore data from any carrier for which the estimate of reliability is below a predetermined threshold.

4. A device as claimed in claim 1, wherein the receiver comprises an input for receiving a signal and a carrier estimator for dividing the received signal into the multiple carriers.

5. A device as claimed in claim 4, wherein the carrier estimator is configured to perform a Fourier transform operation to divide the received signal into the multiple carriers.

6. A device as claimed in claim 4, wherein each carrier occupies a respective frequency or frequency band in the received signal.

7. A device as claimed in claim 6, wherein each carrier occupies a respective frequency or frequency band in the received signal that is distinct from those occupied by all the other carriers.

8. A device as claimed in claim 1, wherein the carriers are carriers of an OFDM signal.

9. A device as claimed in claim 1, wherein the decoder is a Viterbi decoder.

10. A device as claimed in claim 1, further comprising a quality estimator for estimating the quality with which signals are received on each of the carriers, the estimation unit being configured to form an estimate of a reliability of data received on a carrier in dependence on the quality estimate for that carrier.

11. A device as claimed in claim 1, wherein the estimation unit is configured to form the said estimate in dependence on usage data indicating the usage of one or more frequencies in such a way that a lower reliability estimate is formed for data received on a carrier occupying the one or more frequencies than on carriers not occupying the one or more frequencies.

12. A device as claimed in claim 11, wherein the transmitter is configured to transmit for transmitting signals from the device, and to signal the usage data to the receiver so as to indicate the usage of one or more frequencies by the transmitter.

13. A device as claimed in claim 12, wherein the receiver and the transmitter are formed on a single integrated circuit.

14. A method for receiving data carried by multiple carriers at a device comprising a transmitter and a receiver, the method comprising:
    forming an estimate of a reliability with which data from one or more of the carriers is received as distinct from a reliability with which data from one or more other of the carriers is received; and
    forming an estimate of symbols represented by the data received from the carriers in dependence on the estimate of reliability
    wherein the step of forming the estimate of the reliability comprises using knowledge of the frequencies the transmitter and a nearby device are using to form the estimate of the reliability, such that carriers in use by the transmitter are treated as less reliable than carriers in use by the other nearby device, which are in turn treated as less reliable than carriers on which interference is not expected.

15. A device comprising a transmitter and a receiver for receiving data carried by multiple carriers, the receiver comprising:
    an estimation an estimate of a reliability with which data from one or more of the carriers is received as distinct from a reliability with which data from one or more other of the carriers is received; and
    a decoder configured to form an estimate of symbols represented by the data received from the carriers in dependence on the estimate of reliability,
    wherein the estimation unit is configured to use knowledge of which frequencies the transmitter or a nearby device are using to form the estimate of reliability, such that carriers in use by the transmitter are treated as less reliable than carriers in use by the nearby device, which are in turn treated as less reliable than carriers on which interference is not expected.

16. A method for receiving data carried by multiple carriers at a device comprising a transmitter and a receiver, the method comprising:
    forming an estimate of a reliability with which data from one or more of the carriers is received as distinct from a reliability with which data from one or more other of the carriers is received; and
    forming an estimate of symbols represented by the data received from the carriers in dependence on the estimate of reliability;
    wherein the step of forming the estimate of the reliability comprises using knowledge of the frequencies the transmitter or a nearby device are using to form the estimate of the reliability such that carriers in use by the transmitter are treated as less reliable than carriers in use by the nearby device, which are in turn treated as less reliable than carriers on which interference is not expected.

17. A device comprising a transmitter and a receiver for receiving data carried by multiple carriers, the receiver comprising:
    an estimation unit configured to form an estimate of a reliability with which data from one or more of the carriers is received as distinct from a reliability with which data from one or more other of the carriers is received; and a decoder configured to form an estimate of symbols represented by the data received from the carriers in dependence on the estimate of reliability, wherein the estimation unit is configured to use knowledge of which frequencies the transmitter and a nearby device will be using to form the estimate of reliability, such that carriers in use by the transmitter are treated as less reliable than carriers in use by the other nearby device, which are in turn treated as less reliable than carriers on which interference is not expected.

18. A method for receiving data carried by multiple carriers at a device comprising a transmitter and a receiver, the method comprising:

forming an estimate of a reliability with which data from one or more of the carriers is received as distinct from a reliability with which data from one or more other of the carriers is received; and forming an estimate of symbols represented by the data received from the carriers in dependence on the estimate of reliability;

wherein the step of forming the estimate of the reliability comprises using knowledge of the frequencies the transmitter and a nearby device will be using to form the estimate of reliability, such that carriers in use by the transmitter are treated as less reliable than carriers in use by the nearby device, which are in turn treated as less reliable than carriers on which interference is not expected.

19. A device comprising a transmitter and a receiver for receiving data carried by multiple carriers, the receiver comprising:

an estimation unit configured to form an estimate of a reliability with which data from one or more of the carriers is received as distinct from a reliability with which data from one or more other of the carriers is received; and a decoder configured to form an estimate of symbols represented by the data received from the carriers in dependence on the estimate of reliability, wherein the estimation unit is configured to use knowledge of which frequencies the transmitter or a nearby device will be using to form the estimate of reliability, such that carriers in use by the transmitter are treated as less reliable than carriers in use by the other nearby device, which are in turn treated as less reliable than carriers on which interference is not expected.

20. A method for receiving data carried by multiple carriers at a device comprising a transmitter and a receiver, the method comprising:

forming an estimate of a reliability with which data from one or more of the carriers is received as distinct from a reliability with which data from one or more other of the carriers is received; and forming an estimate of symbols represented by the data received from the carriers in dependence on the estimate of reliability;

wherein the step of forming the estimate of reliability comprises using knowledge of the frequencies the transmitter or a nearby device will be using to form the estimate of the reliability, such that carriers in use by the transmitter are treated as less reliable than carriers expected in use by the nearby device, which are in turn treated as less reliable than carriers on which interference is not expected.

* * * * *